US006941970B2

(12) United States Patent
Ibañez Sapiña et al.

(10) Patent No.: US 6,941,970 B2
(45) Date of Patent: Sep. 13, 2005

(54) LIQUID DISTRIBUTOR VALVE

(75) Inventors: Miguel Ibañez Sapiña, Parets del Valles (ES); Armand Puiggros Roig, Parets del Valles (ES)

(73) Assignee: Valvules I Racords Canovelles, S.A., Parets del Valles (ES)

( * ) Notice: Subject to any disclaimer, the term of this patent is extended or adjusted under 35 U.S.C. 154(b) by 0 days.

(21) Appl. No.: 10/841,976

(22) Filed: May 6, 2004

(65) Prior Publication Data

US 2005/0005976 A1 Jan. 13, 2005

(30) Foreign Application Priority Data

May 9, 2003 (ES) .......................................... 200301127

(51) Int. Cl.[7] .......................... F16K 11/02; F16K 31/04

(52) U.S. Cl. ............................. 137/625.11; 137/625.46; 251/248

(58) Field of Search ....................... 137/625.11, 625.46, 137/625.47, 870, 861, 862, 865, 887, 624.11; 251/248, 304, 309

(56) References Cited

U.S. PATENT DOCUMENTS 4,398,562 A * 8/1983 Saarem et al. ......... 137/625.47
5,226,454 A * 7/1993 Cabalfin ..................... 137/870

FOREIGN PATENT DOCUMENTS

| | | | |
|---|---|---|---|
| ES | EP1150050 | * 10/2001 | ............ 137/625.46 |
| ES | EP1475558 | * 10/2004 | ............ 137/625.11 |
| FR | EP0287457 | * 10/1988 | ............ 137/625.46 |

* cited by examiner

*Primary Examiner*—Kevin Lee
(74) *Attorney, Agent, or Firm*—Merchant & Gould P.C.

(57) ABSTRACT

A liquid distributor valve. This valve comprises a compartmented base body being provided with a top cover and having several outlets and an upperly arranged, lateral inlet, a rotatable obturator bell being arranged between the outlets and said inlet and having an upperly arranged shaft projecting through said cover, the shaft being governed by an electronic, externally arranged control. This valve is characterized in that the electronic, externally arranged control forms an independent assembly being apt to be removably fitted onto the base body, the obturator bell shaft comprising a cap being apt to allow to removably couple it, the a cap also being apt to penetrate into the assembly forming the electronic, externally arranged control and to be coupled to the shaft of the gearmotor pertaining to the electronic, externally arranged control.

4 Claims, 2 Drawing Sheets

LIQUID DISTRIBUTOR VALVE

BACKGROUND OF THE INVENTION

Liquid distributor valves are known which comprise a radially compartmented base body having several outlets and an upperly arranged, lateral inlet, a rotatable obturator bell being interposed between said outlets and said inlet and being provided with an upperly arranged shaft projecting through the top cover of said body and being actuated by a manual or electronic, externally arranged control.

This type of electronically actuated valves has the drawback that the electronic control portion and the mechanical portion acting within the base body are linked to each other thus forming an assembly. This represents a substantial drawback when there is a need to repair the electronic portion or the mechanical portion, since the assembly being made up by them must then be disassembled in order to replace or repair the affected components.

SUMMARY OF THE INVENTION

It is the object of this invention to obviate said drawbacks, the liquid distributor valve being for such a purpose characterized in that it comprises the electronic, externally arranged control forming a wholly independent assembly being apt to be removably fitted onto the base body, the obturator bell shaft comprising means being apt to allow to removably couple it, said means also being apt to penetrate into the assembly forming the electronic, externally arranged control and to be coupled to the shaft of the gearmotor pertaining to said electronic control.

The means allowing to couple the obturator bell shaft to the gearmotor shaft comprise a cap being fitted onto the bell shaft and being provided with a screw being inserted into its top opening, said screw threadingly engaging an axial thread of said shaft and comprising a head being provided with recesses being apt to engagingly receive protrusions of the gearmotor shaft.

The outer periphery of the above-mentioned cap forms a dentation in such a way that together and in cooperation with a resiliently biased pawl being provided in the base serving as a support for the electronic, externally arranged control said dentation makes up a ratchet allowing to stabilize the different rotational positions of the obturator bell, said cap being radially provided with an appendage being apt to act on the microswitches equipping the electronic circuit of the control in order to thus determine said positions of the obturator bell.

The screw being fitted onto the obturator bell shaft has a flange abuttingly contacting a limit switch being provided at the gearmotor in order to thus limit the lifting motion of said screw and bell.

These and other characteristic features will be best made apparent by the following detailed description whose understanding will be made easier by the accompanying two sheets of drawings showing a practical embodiment being cited only by way of example not limiting the scope of the present invention.

DETAILED DESCRIPTION

According to the drawings this liquid distributor valve comprises a compartmented base body (1) having several outlets (2) and a lateral inlet (4), a cover (3) being fastened onto said base body.

Figure 1:
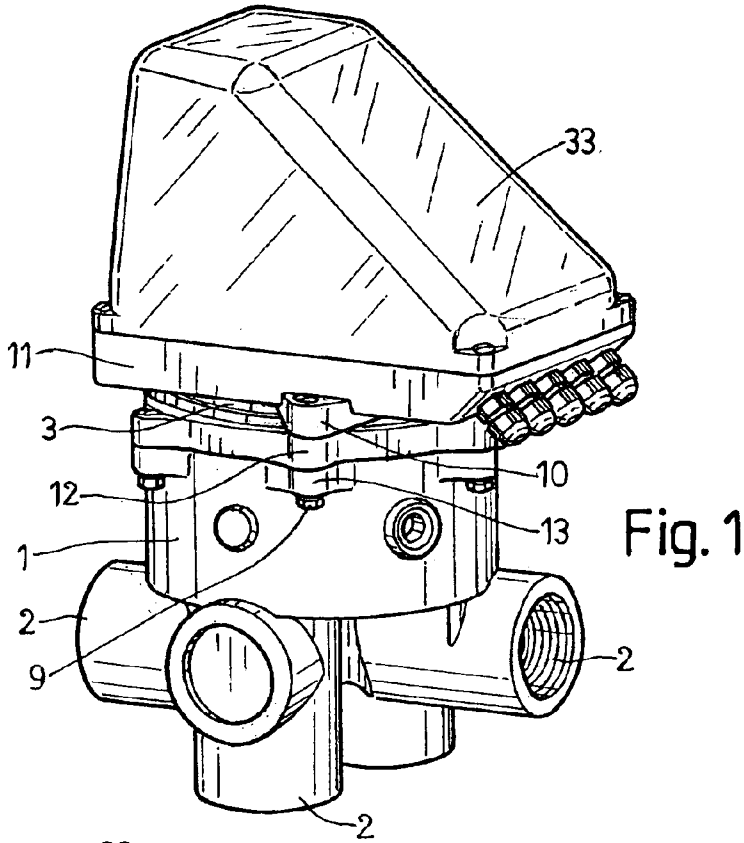
FIG. 1 illustrates in a perspective view the distributor valve being the object of the invention.
Figure 2:
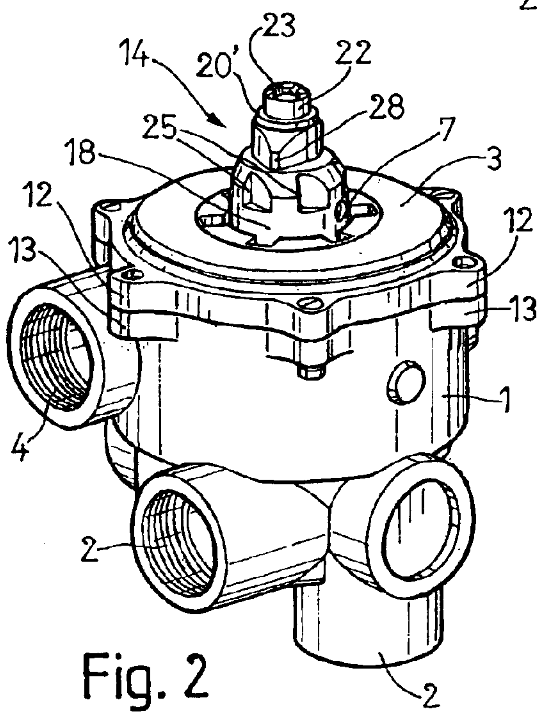
FIG. 2 shows in a perspective view the base body of said valve.
Figure 3:
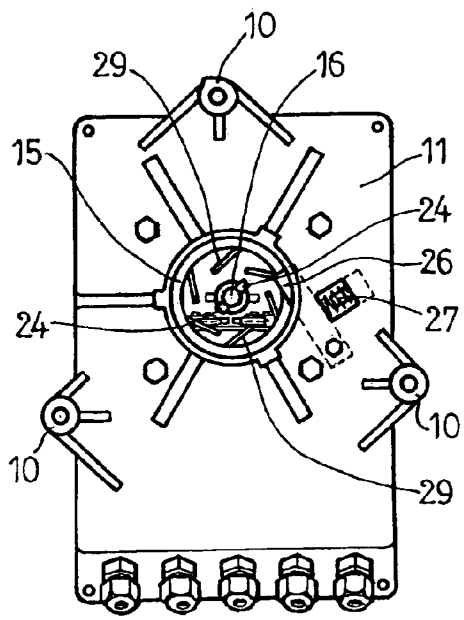
FIG. 3 represents in a bottom plan-view the assembly making up the electronic, externally arranged control.
Figure 5:
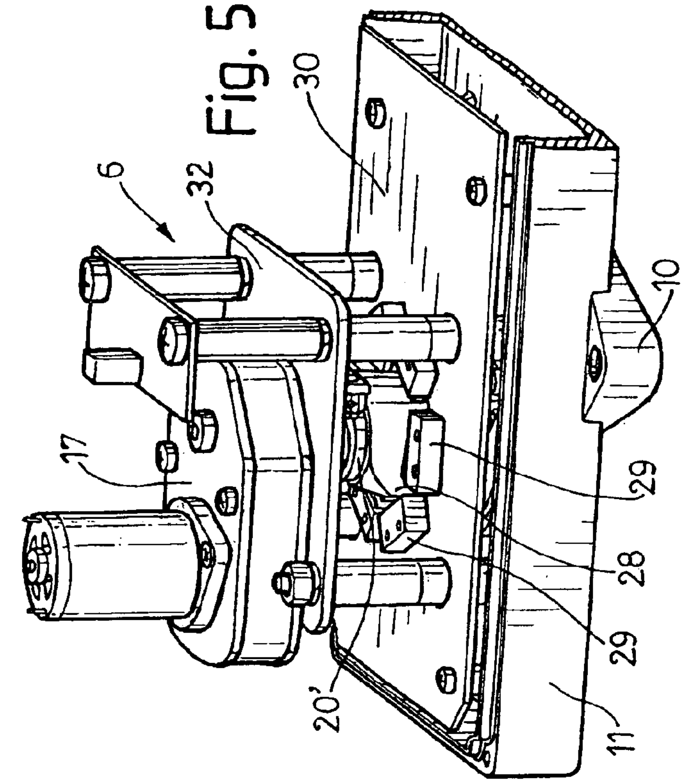
FIGS. 5 and 6 are each a perspective view respectively showing in one of them the microswitches and the gearmotor, and in the other one the gearmotor shaft and the limit switch.
Figure 6:
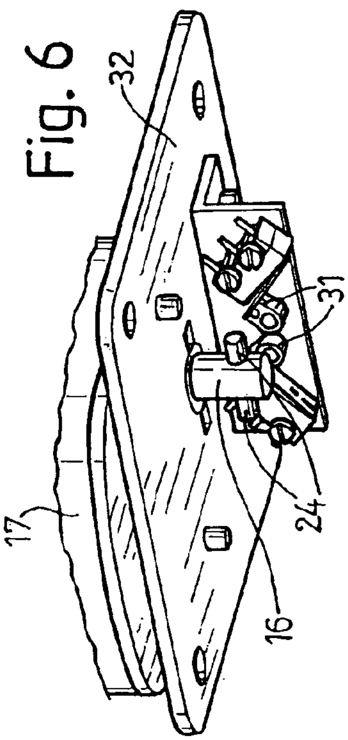
Figure 4:
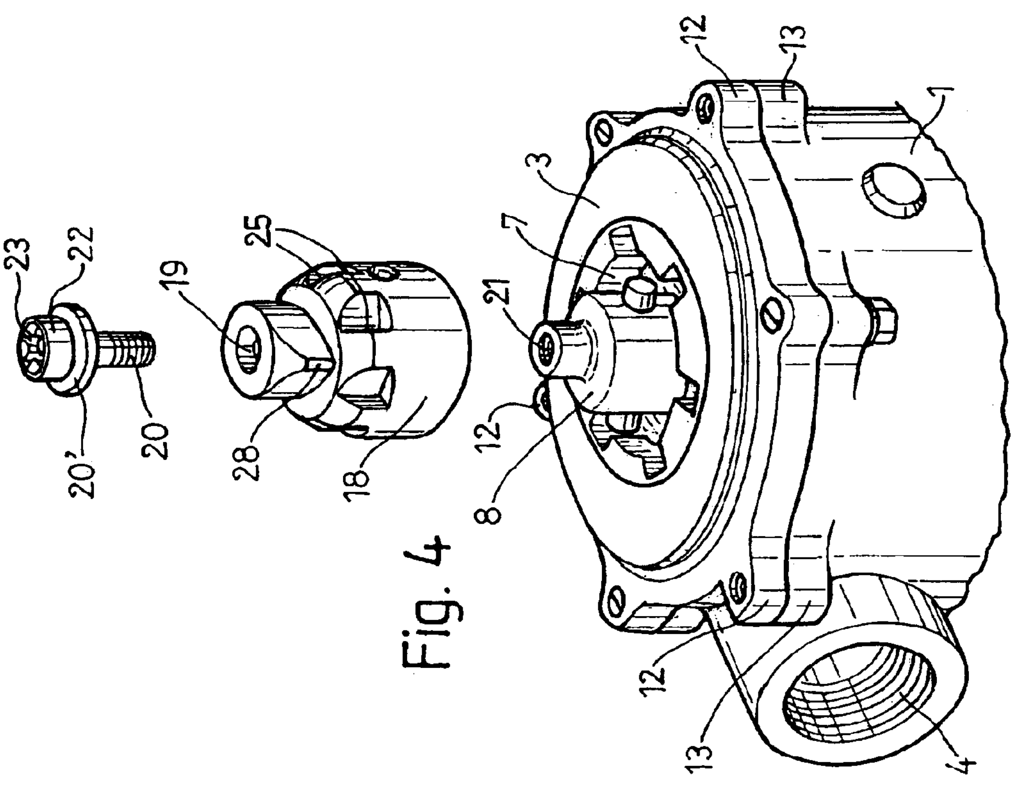
FIG. 4 is a perspective view showing in detail the means allowing to couple the obturator bell shaft to the gearmotor shaft of the electronic control.

The base body (1) does innerly comprise a rotatable obturator bell being arranged between the outlets (2) and the inlet (4), said bell being governed by an electronic, externally arranged control (6) being superimposed on the cover (3), a shaft (8) corresponding to the obturator bell projecting through a central orifice (7) of said cover (FIG. 4).

A characteristic feature of this distributor valve lies in the fact that the electronic, externally arranged control (6) forms an independent assembly being apt to be removably fitted onto the base body (1). In this embodiment this fitting is carried out by means of three bolts extending each through a respective eye lug (10) being provided at the contour of the base (11) serving as a support for the electronic, externally arranged control (6), through a respective eye lug (12) being provided at the periphery of the cover (3), and through a respective eye lug (13) being provided at the periphery of the base body (1), said bolts being threadingly engaged by the corresponding nuts (9). Said fitting of the electronic, externally arranged control (6) to the base body (1) can also be carried out through other means, such as by means of a bayonet attachment.

The obturator bell shaft (8) comprises coupling means (14) being apt to penetrate into the assembly making up the electronic, externally arranged control (6) through an orifice (15) of the base (11) to thus be coupled to the shaft (16) of the gearmotor (17) pertaining to said control (6).

These coupling means (14) comprise a cap (18) being apt to be fitted onto the obturator bell shaft (8), a screw (20) being inserted into the top opening (19) of said cap and being thus threadingly engaged with an axial thread (21) being provided in said shaft, said screw comprising a head (22) having recesses (23) being arranged in a crosswise arrangement and being apt to engagingly receive two opposite protrusions (24) of the gearmotor shaft (16).

The outer periphery of cap (18) forms a dentation (25) in such a way that together and in cooperation with a pawl (26) being resiliently biased by a spring (27), both of them being provided in the base (11), said dentation makes up a ratchet allowing to stabilize the different rotational positions of the obturator bell, said cap (8) being radially provided with an appendage (28) being apt to act on the microswitches (29) equipping the electronic circuit being printed on the board (30) and comprising all of the components (not shown) integrating the control (6) in order to thus determine said positions of the obturator bell.

The screw (20) has a flange (20') abuttingly contacting a limit switch (31) being provided at the gearmotor (17) in order to thus limit the lifting motion of said screw and obturator bell, said gearmotor being supported by a plate (32) being installed above the printed circuit board (30).

Whenever wishing to manually actuate this valve, upon removal of cap (18) and screw (20) the shaft (8) and the cover (3) are prepared to receive the coupling of a handle.

The electronic, externally arranged control (6) is protected by means of a cover (33) being apt to be removably fitted onto the base (11).

The invention can within its essentiality be put into practice in other embodiments only in detail differing from the one having been described above only by way of example, said other embodiments also falling within the scope of the protection being sought.

What is claimed is:

1. A liquid distributor valve comprising a compartmented base body being provided with a top cover and having several outlets and an upperly arranged, lateral inlet, a rotatable obturator bell being arranged between said outlets and said inlet and having an upperly arranged shaft projecting through said cover, said shaft being governed by an electronic, externally arranged control comprising a gearmotor having a shaft; wherein the electronic, externally arranged control forms an independent assembly being apt to be removably fitted onto the base body, the obturator bell shaft comprising a cap being fitted onto said obturator bell shaft and provided with a screw being inserted into a top opening of said cap, said screw threadingly engaging an axial thread of said shaft and comprising a head being provided with recesses being apt to engagingly receive protrusions of the gearmotor shaft.

2. A liquid distributor valve as per claim 1, wherein the outer periphery of the cap forms a dentation in such a way that together and in cooperation with a resiliently biased pawl being provided in a base serving as a support for the electronic, externally arranged control said dentation makes up a ratchet allowing to stabilize the different rotational positions of the obturator bell, said cap being radially provided with an appendage being apt to act on microswitches equipping the electronic circuit of the control in order to thus determine said positions of the obturator bell.

3. A liquid distributor valve as per claim 1, wherein the screw being fitted onto the obturator bell shaft has a flange abuttingly contacting a limit switch being provided at the gearmotor in order to thus limit the lifting motion of said screw and obturator bell.

4. A liquid distributor valve as per claim 1, wherein upon removal of said cap and screw the obturator bell shaft is prepared to receive the coupling of a handle allowing to manually actuate said bell.

* * * * *